United States Patent
Yang et al.

(10) Patent No.: US 10,321,322 B2
(45) Date of Patent: Jun. 11, 2019

(54) METHOD AND DEVICE FOR PROCESSING INFORMATION

(71) Applicant: ZTE CORPORATION, Shenzhen, Guangdong Province (CN)

(72) Inventors: Weiwei Yang, Shenzhen (CN); Bo Dai, Shenzhen (CN); Shuqiang Xia, Shenzhen (CN); Chunli Liang, Shenzhen (CN); Huiying Fang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 162 days.

(21) Appl. No.: 15/038,913

(22) PCT Filed: Jun. 17, 2014

(86) PCT No.: PCT/CN2014/080146
§ 371 (c)(1),
(2) Date: May 24, 2016

(87) PCT Pub. No.: WO2015/100959
PCT Pub. Date: Jul. 9, 2015

(65) Prior Publication Data
US 2016/0381561 A1  Dec. 29, 2016

(30) Foreign Application Priority Data
Dec. 31, 2013 (CN) .......................... 2013 1 0753174

(51) Int. Cl.
*H04J 3/04* (2006.01)
*H04W 16/02* (2009.01)
(Continued)

(52) U.S. Cl.
CPC ............. *H04W 16/02* (2013.01); *H04L 5/001* (2013.01); *H04L 5/0053* (2013.01);
(Continued)

(58) Field of Classification Search
CPC ....... H04W 16/02; H04L 5/001; H04L 5/0053
(Continued)

(56) References Cited

U.S. PATENT DOCUMENTS 10,027,444 B2 * 7/2018 Yang ..................... H04L 1/1854
2009/0316626 A1 * 12/2009 Lee ....................... H04L 1/1607
370/328

(Continued)

FOREIGN PATENT DOCUMENTS

CA  2860708  7/2013
CN  103427938 A  4/2013
(Continued)

OTHER PUBLICATIONS

International Search Report (Form PCT/ISA/210) for International Application No. PCT/CN2014/080146 dated Sep. 26, 2014.
(Continued)

*Primary Examiner* — Thai D Hoang
(74) *Attorney, Agent, or Firm* — Ferguson Case Orr Paterson LLP (57) ABSTRACT

The embodiments of disclosure disclose a method and device for processing information. The method includes that: according to a predefined rule, subframes of a first serving cell are divided into multiple subframe groups; a management mode is configured for each of the subframe groups; and according to the management mode configured for each of the subframe groups, information on the first serving cell is processed. By means of the embodiments of the disclosure, a problem that some downlink subframes in a serving cell cannot be scheduled is solved, and different requirements of all subframes can be met, thereby improving a performance of a system, and ensuring an efficiency of data transmission.

19 Claims, 5 Drawing Sheets (51) Int. Cl.
*H04L 5/00* (2006.01)
*H04L 1/18* (2006.01)
*H04L 5/14* (2006.01)
*H04W 72/04* (2009.01)
*H04W 88/02* (2009.01)

(52) U.S. Cl.
CPC .............. *H04L 1/1864* (2013.01); *H04L 5/14* (2013.01); *H04W 72/0406* (2013.01); *H04W 88/02* (2013.01)

(58) Field of Classification Search
USPC ................... 370/329–330, 335–338, 395.21, 370/395.4–395.43, 473
See application file for complete search history.

(56) References Cited

U.S. PATENT DOCUMENTS

| | | | |
|---|---|---|---|
| 2011/0176461 A1 | 7/2011 | Astely et al. | |
| 2014/0198680 A1* | 7/2014 | Siomina | H04L 5/14 370/252 |
| 2014/0254531 A1* | 9/2014 | Lee | H04L 5/006 370/329 |
| 2014/0362747 A1* | 12/2014 | Yang | H04L 1/1861 370/280 |
| 2015/0296359 A1* | 10/2015 | Edge | H04W 4/22 455/404.2 |
| 2016/0029239 A1* | 1/2016 | Sadeghi | H04W 52/244 370/252 |
| 2016/0135147 A1* | 5/2016 | Ouchi | H04W 52/146 370/329 |

FOREIGN PATENT DOCUMENTS

| | | |
|---|---|---|
| CN | 103326833 A | 9/2013 |
| CN | 103582099 A | 2/2014 |
| CN | 103780361 A | 5/2014 |
| EP | 2533584 A1 | 12/2012 |
| WO | WO 2009151280 A2 | 12/2009 |

OTHER PUBLICATIONS

Extended European Search Report from corresponding European Patent Appl. No 14876348.5. dated Mar. 15, 2017.

Intel Corporation: "On support of TDD-FDD Carrier Aggregation", 3GPP Draft. R1-134133. 3$^{rd}$ Generation Partnership Project (3GPP), vol. RAN WG1, No. Guangzhou, China: 20131007-2013011 Sep. 28, 2013 (Sep. 28, 2013), XP050717323, Retrieved from the Internet: URL:http://www.3gpp.org/ftp/tsg_ran/WG1_RL1/TSGR1_74b/Docs, [retrieved on Sep. 28, 2013] section 2.3: figure 4.

Huawei et al: "Discussion on UE measurements for MBMS", 3GPP Draft; R1-134351, 3$^{rd}$ Generation Partnership Project (3GPP). Mobile Competence Centre: 650 . Route Des Lucioles: F-06921 Sophia-Antipolis Cedex; France, vol. RAN WG1, No. Guangzhou, China: 20131007-20131011 Sep. 28, 2013 (Sep. 28, 2013). XP0507717493, Retrieved from the Internet: URL:http://www./3gpp.org/ftp/tsg_ran/WG1_RL1/TSGR1_74b/Docs/ [Retrieved on Sep. 28, 2013] section 3.

* cited by examiner

METHOD AND DEVICE FOR PROCESSING INFORMATION

TECHNICAL FIELD

The disclosure relates to a technical field of communications, and in particular to a method and device for processing information.

BACKGROUND

Figure 1:
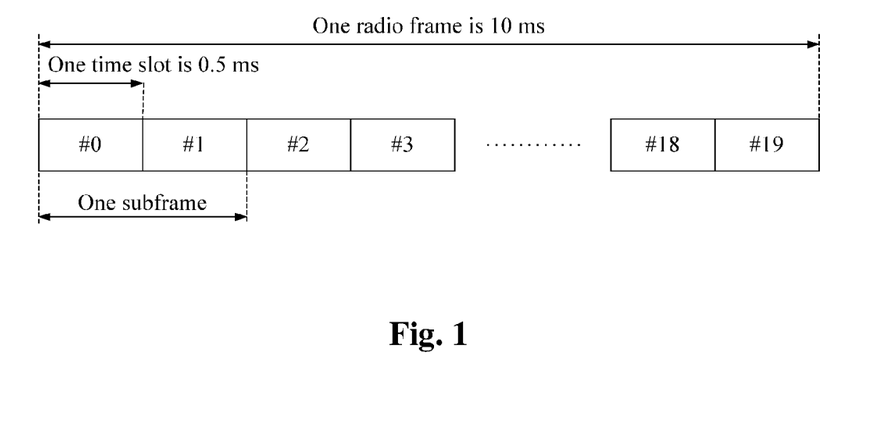
FIG. 1 is a schematic diagram of a frame structure in an FDD system in the related art.
Figure 2:
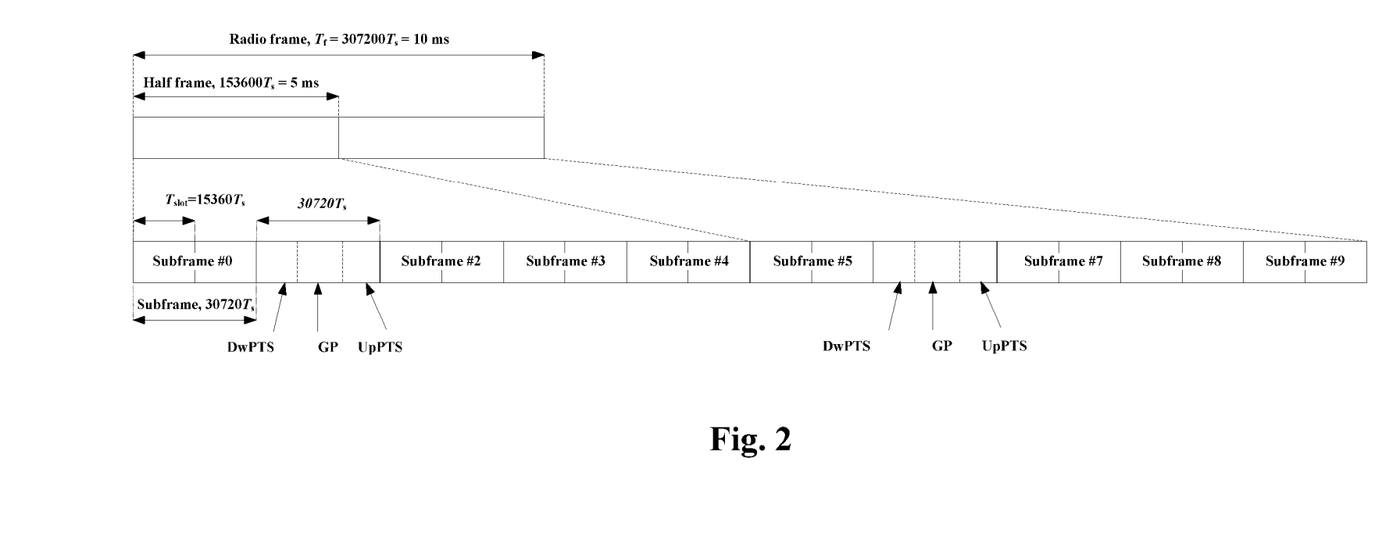
FIG. 2 is a schematic diagram of a frame structure in a TDD system in the related art.

A radio frame in a Long Term Evolution (LTE) system and an LTE-Advanced (LTE-A) system adopts a frame structure of a Frequency Division Duplex (FDD) mode or a Time Division Duplex (TDD) mode. FIG. 1 is a schematic diagram of a frame structure in an existing LTE/LTE-A FDD system. As shown in FIG. 1, a 10 ms radio frame is composed of twenty slots which are 0.5 ms long and numbered from 0 to 19, and a slot $2i$ and a slot $2i+1$ form a subframe i which is 1 ms long. FIG. 2 is a schematic diagram of a frame structure in an existing LTE/LTE-A TDD system. A 10 ms radio frame is composed of two half frames which are 5 ms long. Each half frame includes five subframes which are 1 ms long. A subframe i is defined as a slot $2i$ and a slot $2i+1$ which are 0.5 ms long.

In above-mentioned two frame structures, for a Normal Cyclic Prefix (Normal CP), a time slot contains seven symbols which are 66.7 us long, wherein a CP length of a first symbol is 5.21 us, and CP lengths of the other six symbols are 4.69 us. For an Extended CP, a time slot contains six symbols, and CP lengths of all symbols are 16.67 us. Supported uplink-downlink configurations are shown in Table 1.

TABLE 1

| Uplink-downlink configuration | Downlink-uplink conversion point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As disclosed above, for each subframe in a radio frame, 'D' represents a subframe dedicated for downlink transmission, 'U' represents a subframe dedicated for uplink transmission, and 'S' represents a special subframe, containing a Downlink Pilot Time Slot (DwPTS), a Guard Period (GP) and an Uplink Pilot Time Slot (UpPTS).

In the LTE system, a Hybrid Automatic Repeat reQuest (HARQ) process refers to that: when data needs to be transmitted at a sending end, a receiving end allocates information needed during transmission via downlink signalling, such as frequency domain resources and packet information. The sending end sends the data according to these pieces of information, and saves the data in a cache of the sending end to facilitate retransmission. When receiving the data, the receiving end detects the data, if the data is correctly received, Acknowledged (ACK) information is sent to the sending end, after receiving the ACK information, the sending end empties the cache used in this transmission, and this transmission is ended. If the data is not correctly received, Non-acknowledged (NACK) information is sent to the sending end, packets which are not correctly received are saved in a cache of the receiving end. After receiving the NACK information, the sending end extracts the data from the cache of the sending end and retransmits the data at a corresponding subframe and a corresponding frequency domain position by using a specific packet format. After receiving retransmitted packets, the receiving end combines the retransmitted packets with packets which are not correctly received, detection is performed again; and then the process is repeated until the data are correctly received or a frequency of transmission of the data exceeds a maximum transmission frequency threshold.

In the LTE/LTE-A system, timing regulations regarding scheduling of a Physical Downlink Shared Channel (PDSCH) in a downlink HARQ, namely scheduling of the downlink HARQ, are as follows: an User Equipment (UE) detects a Physical Downlink Control Channel (PDCCH) on a subframe n, and analyzes a PDSCH of the current subframe according to information of the PDCCH.

In the LTE/LTE-A FDD system, timing rules regarding sending of a Physical Uplink Control Channel (PUCCH) corresponding to an HARQ-ACK of the PDSCH in the downlink HARQ are as follows, namely a timing relation of the downlink HARQ is regulated as follows: the UE detects the PDCCH for transmitting or indicating downlink Semi-Persistent Scheduling (SPS) release of the PDSCH on the subframe n, and transmits a corresponding HARQ-ACK response on a subframe n+4. In the LTE/LTE-A TDD system, a timing relation of the downlink HARQ is regulated as follows: the UE detects the PDCCH for transmitting or indicating the downlink SPS release of the PDSCH on a subframe n-k, and transmits a corresponding HARQ-ACK response on an uplink subframe n, where k belongs to K, and K is valued as shown in Table 2.

TABLE 2

Value of K in Different Uplink-Downlink Configurations

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE system, in a FDD system, due to a one-to-one correspondence relation between uplink and downlink subframes, when the PDSCH contains only one transmission block, the UE needs to feed back 1-bit ACK/NACK answer information, and when the PDSCH contains two transmission blocks, the UE needs to feed back 2-bit ACK/NACK answer information. The UE sends ½-bit ACK/NACK answer information by using a PUCCH format1a/1b. In a TDD system, due to no existence of the one-to-one correspondence relation between the uplink and downlink subframes, that is, ACK/NACK answer information corresponding to a plurality of downlink subframes needs to be sent on a PUCCH of an uplink subframe, a downlink subframe set corresponding to the uplink subframe forms a 'bundling window'. There are two sending methods for the ACK/NACK answer information. One sending method is a bundling method, of which a core concept refers to that: spatial bundling operation needs to be performed on the ACK/NACK answer information of at least one transmission block corresponding to each downlink subframe fed back by the uplink subframe, if a downlink subframe has two transmission blocks, the UE needs to feed back the 2-bit ACK/NACK answer information, if each subframe has only one transmission block, the UE needs to feed back the 1-bit ACK/NACK answer information, and the UE sends the ½-bit ACK/NACK answer information by using the PUCCH format1a/1b. Another sending method is a multiplexing (multiplexing with channel selection) method of which a core concept refers to that: different feedback states of downlink subframes needing to be fed back on the uplink subframe are represented by utilizing different PUCCHs and different modulation symbols on each of different PUCCHs, if each downlink subframe has a plurality of transmission blocks, spatial bundling and channel selection are successively performed on ACK/NACK fed back by the transmission blocks of each downlink subframe, and the UE sends an ACK/NACK answer message by using a format 1b with channel selection.

The most significant characteristics of the LTE-A system with respect to the LTE system refer to that: a carrier aggregation technology is introduced to the LTE-A system, that is, bandwidths of the LTE system are aggregated to obtain a larger bandwidth. In a system to which carrier aggregation is introduced, a carrier for aggregation is called a Component Carrier (CC), and is also called a serving cell. Meanwhile, concepts of a Primary Component Carrier/Cell (PCC/PCell) and a Secondary Component Carrier/Cell (SCC/SCell) are also proposed. In a carrier aggregated system, a primary serving cell and a secondary serving cell are included at least, wherein the primary serving cell is under an activated state all the time, and it is regulated that the PUCCH is transmitted only on the PCell.

Figure 3:
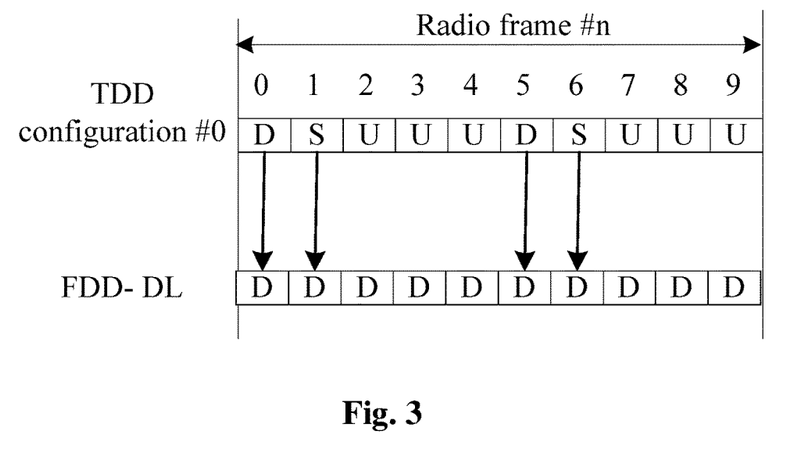
FIG. 3 is a schematic diagram of cross-carrier scheduling in the related art.

An existing carrier aggregation technology is only applied to an FDD serving cell or a TDD serving cell. In a subsequent version, the FDD serving cell and the TDD serving cell are considered. When the FDD serving cell and the TDD serving cell are aggregated, if cross-carrier scheduling is enabled, when the TDD serving cell is the primary serving cell, only some downlink subframes are scheduled on the FDD serving cell. As shown in FIG. 3, when the primary serving cell is TDD uplink-downlink configuration #0 and the cross-carrier scheduling is enabled, only downlink subframes #0, #1, #5 and #6 on the FDD serving cell can be scheduled, so as to cause reduction of a downlink throughput. In order to ensure the downlink throughput, it is necessary to solve a problem that some downlink subframes on a scheduled serving cell cannot be scheduled. In addition, the existing LTE system adopts the same management mode including a scheduling mode, a transmission mode, a sequence generation mode, a scrambling mode, signal configuration and power control. However, disturbed conditions of different subframes are different, and receiving nodes or sending nodes are different. If the same management mode is adopted, different requirements of all subframes cannot be met, a performance of the system is influenced, and an efficiency of data transmission cannot be ensured.

SUMMARY

The embodiments of disclosure provide a method and device for processing information, so as to at least solve problems in the related art that requirements of each subframe cannot be met, and a performance of a system and an efficiency of data transmission are low due to adoption of the same management mode for all subframes.

According to one embodiment of the disclosure, A method for processing information is provided, which may include that:

dividing subframes of a first serving cell into multiple subframe groups according to a predefined rule; configuring a management mode for each of the subframe groups; and processing information on the first serving cell according to the management mode configured for each of the subframe groups.

In an example embodiment, the predefined rule includes at least one of: dividing the subframes of the first serving cell into the multiple subframe groups according to a subframe attribute of a second serving cell; dividing the subframes of the first serving cell into the multiple subframe groups according to signalling; dividing the subframes of the first serving cell into the multiple subframe groups according to subframe types; and dividing the subframes of the first serving cell into the multiple subframe groups according to a predefined subframe set.

In an example embodiment, dividing the subframes of the first serving cell into the multiple subframe groups according to the subframe attribute of the second serving cell includes: dividing subframes of the first serving cell, having the same attribute as the subframe attribute of the second serving cell, under the same subframe index into one group, and dividing subframes of the first serving cell, having different attributes from the subframe attribute of the second serving cell, under the same subframe index into another group.

In an example embodiment, dividing the subframes of the first serving cell into the multiple subframe groups according to the signalling includes: dividing the subframes of the first serving cell into the multiple subframe groups according to a subframe index, indicated in the signalling, of each group.

In an example embodiment, dividing the subframes of the first serving cell into the multiple subframe groups according to the subframe types includes one of: dividing Multicast Broadcast Single Frequency Network, MBSFN, subframes of the first serving cell into one group, and dividing non-MBSFN subframes of the first serving cell into another group; dividing downlink subframes, indicated by a System Information Block 2, SIB2, of the first serving cell into one group, and dividing subframes obtained by switching uplink subframes to downlink subframes into another group; and dividing flexible subframes of the first serving cell into one group, and dividing fixed subframes into another group.

In an example embodiment, dividing the subframes of the first serving cell into the multiple subframe groups according to the predefined subframe set includes one of: dividing subframes having predefined odd subframe indexes of the first serving cell into one group, and dividing subframes having even subframe indexes into another group; dividing subframes having predefined subframe indexes (#0, #1, #5 and #6) of the first serving cell into one group, and dividing the remaining subframes into another group; dividing predefined first half frames of the first serving cell into one group, and dividing predefined second half frames of the first serving cell into another group; dividing subframes, used for transmitting binding Paging, of the first serving cell into one group, and dividing the remaining subframes into another group; dividing subframes having predefined subframe indexes (#0 and #5) of the first serving cell into one group, dividing subframes having predefined subframe indexes (#1 and #6) into one group, and dividing the remaining subframes into another group; and dividing N subframes into one group according to a negotiation made between a base station and a terminal in advance, wherein N is a positive integer of greater than or equal to 1.

In an example embodiment, configuring the management mode for each of the subframe groups includes at least one of: indicating the management mode corresponding to each of the subframe groups by signalling; negotiating about the management mode corresponding to each of the subframe groups between a base station and a terminal in advance; and determining the management mode corresponding to each of the subframe groups according to a type of each of the subframe groups.

In an example embodiment, the management mode includes at least one of: a scheduling mode, a transmission mode, a sequence generation mode, a scrambling mode, a signal configuration mode and a power control mode.

In an example embodiment, when the management mode includes the scheduling mode, processing the information on the first serving cell according to the management mode configured for each of the subframe groups includes: processing a Physical Uplink Shared Channel, PUSCH/Physical Downlink Shared Channel, PDSCH, on the first serving cell according to the scheduling mode of each of the subframe groups.

In an example embodiment, processing the PUSCH/PDSCH on the first serving cell according to the scheduling mode of each of the subframe groups includes: when the scheduling mode of each of the subframe groups is self-scheduling, detecting a PDCCH/Enhanced PDCCH, EPDCCH, corresponding to the PUSCH/PDSCH on a downlink subframe, which corresponds to each of the subframe groups of the first serving cell; or when the scheduling mode of each of the subframe groups is cross-carrier scheduling, detecting the PDCCH/EPDCCH on a downlink subframe corresponding to subframe groups of one serving cell other than the first serving cell.

In an example embodiment, processing the PUSCH/PDSCH on the first serving cell according to the scheduling mode of each of the subframe groups further includes: performing timing on scheduling of the first serving cell and/or Hybrid Automatic Repeat reQuest-Acknowledged, HARQ-ACK, timing according to reference scheduling timing and/or HARQ-ACK timing, wherein the reference scheduling timing and/or HARQ-ACK timing is scheduling timing and/or HARQ-ACK timing corresponding to the first serving cell, or the reference scheduling timing and/or HARQ-ACK timing is scheduling timing and/or HARQ-ACK timing corresponding to the second serving cell, or the reference scheduling timing and/or HARQ-ACK timing is scheduling timing and/or HARQ-ACK timing except the scheduling timing and/or HARQ-ACK timing corresponding to the first serving cell and the scheduling timing and/or HARQ-ACK timing corresponding to the second serving cell, or the reference scheduling timing and/or HARQ-ACK timing is any HARQ-ACK timing within scheduling timing and/or HARQ-ACK timing corresponding to a current Frequency Division Duplex, FDD, system and a Time Division Duplex, TDD, system.

In an example embodiment, when the management mode includes the transmission mode, processing the information on the first serving cell according to the management mode configured for each of the subframe groups includes: processing channels and/or signals on subframes in each of the subframe groups according to the transmission mode corresponding to each of the subframe groups.

In an example embodiment, when the management mode includes the sequence generation mode, processing the information on the first serving cell according to the management mode configured for each of the subframe groups includes: generating channels and/or sequences needed by the channels on subframes in each of the subframe groups according to the sequence generation mode corresponding to each of the subframe groups.

In an example embodiment, when the management mode includes the scrambling mode, processing the information on the first serving cell according to the management mode configured for each of the subframe groups includes: scrambling signals and/or channels on subframes in each of the subframe groups according to the scrambling mode corresponding to each of the subframe groups.

In an example embodiment, when the management mode includes the signal configuration mode, processing the information on the first serving cell according to the management mode configured for each of the subframe groups includes: configuring signals on subframes in each of the subframe groups according to the signal configuration mode corresponding to each of the subframe groups.

In an example embodiment, when each management mode includes the power control mode, processing the information on the first serving cell according to the management mode configured for each of the subframe groups includes: performing power setting on signals/channels on subframes in each of the subframe groups according to a power control parameter corresponding to each of the subframe groups.

In an example embodiment, the subframes include downlink subframes and/or uplink subframes.

In an example embodiment, processing the information on the first serving cell includes: sending and/or receiving the information on the first serving cell.

In an example embodiment, the information on the first serving cell includes: signals and/or channels on the first serving cell.

In an example embodiment, the first serving cell includes at least one of: a scheduled serving cell; a serving cell corresponding to FDD; and a secondary serving cell.

In an example embodiment, the second serving cell includes at least one of: a scheduling cell; a serving cell corresponding to TDD; and a primary serving cell.

According to another aspect of the disclosure, a device for processing information is provided, which may include:

a grouping component, configured to divide subframes of a first serving cell into multiple subframe groups according to a predefined rule; a configuration component, configured to configure a management mode for each of the subframe groups; and a processing component, configured to process information on the first serving cell according to the management mode configured for each of the subframe groups.

In an example embodiment, the device is located at a terminal or a base station.

By means of the embodiments of the disclosure, the subframes of the serving cell are divided into multiple subframe groups, the management mode is configured for each of the subframe groups, and according to the management mode configured for each of the subframe groups, the information on the serving cell is processed. The problem that some downlink subframes in the serving cell cannot be scheduled is solved, and different requirements of all subframes can be met, thereby improving the performance of a system, and ensuring the efficiency of data transmission.

BRIEF DESCRIPTION OF THE DRAWINGS

The drawings described here are intended to provide further understanding of the disclosure, and form a part of the disclosure. The schematic embodiments and descriptions of the disclosure are intended to explain the disclosure, and do not form improper limits to the disclosure. In the drawings.

DETAILED DESCRIPTION

The disclosure is described in detail below with reference to the drawings and the embodiments. It needs to be noted that the embodiments of the disclosure and the characteristics in the embodiments can be combined under the condition of no conflicts.

According to an embodiment of the disclosure, A method for processing information is provided.

Figure 4:
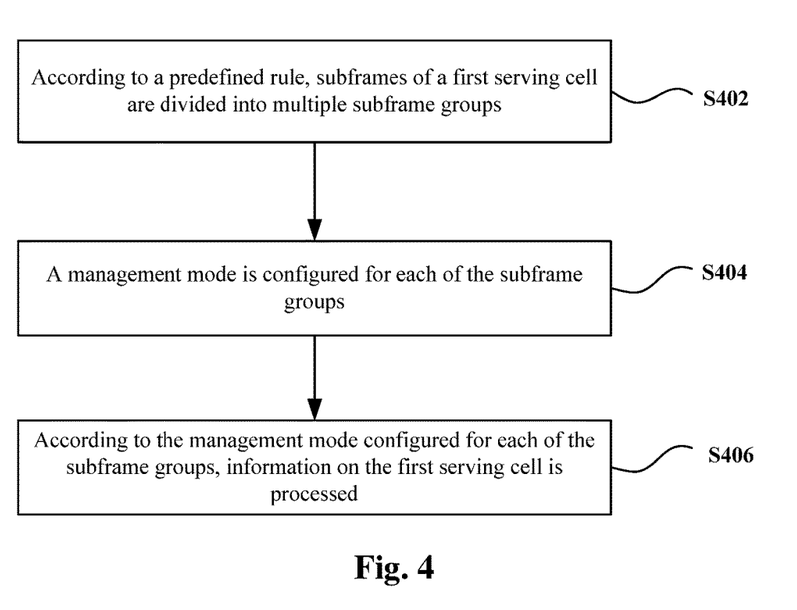
FIG. 4 is a flowchart of A method for processing information according to an embodiment of the disclosure.

FIG. 4 is a flowchart of a method for processing information according to an embodiment of the disclosure. As shown in FIG. 4, the method includes Step S402 to Step S406 as follows.

As shown in FIG. 4, the method for processing information according to the embodiment of the disclosure starts from Step S402. In Step S402, according to a predefined rule, subframes of a first serving cell are divided into multiple subframe groups.

Optionally, the predefined rule in Step S402 includes, but not limited to, at least one of:

Rule 1: dividing the subframes of the first serving cell into the multiple subframe groups according to a subframe attribute of a second serving cell;

Rule 2: dividing the subframes of the first serving cell into the multiple subframe groups according to signalling;

Rule 3: dividing the subframes of the first serving cell into the multiple subframe groups according to subframe types; and Rule 4: dividing the subframes of the first serving cell into the multiple subframe groups according to a predefined subframe set.

Moreover, if the subframes of the first serving cell are grouped by adopting Rule 1, the subframes of the first serving cell can be grouped in the following modes: dividing subframes of the first serving cell, having the same attribute as the subframe attribute of the second serving cell, under the same subframe index into one group, and dividing subframes of the first serving cell, having different attributes from the subframe attribute of the second serving cell, under the same subframe index into another group.

If the subframes of the first serving cell are grouped by adopting Rule 2, the subframes of the first serving cell are grouped according to a subframe index, indicated in the signalling, in each group. By adopting the rule, a grouping mode can be determined by a base station, the base station sends signalling to a terminal to indicate a grouping mode for the subframes to the terminal, and after receiving the signalling from the base station, the terminal groups the subframes according to an indication of the signalling.

Optionally, if the subframes are grouped by adopting Rule 3, the subframes of the first serving cell can be grouped in at least one of the following modes:

(1) dividing MBSFN subframes of the first serving cell into one group, and dividing non-MBSFN subframes of the first serving cell into another group;

(2) dividing downlink subframes, indicated by an SIB2, of the first serving cell into one group, and dividing subframes obtained by switching uplink subframes to downlink subframes into another group; and (3) dividing flexible subframes of the first serving cell into one group, and dividing fixed subframes into another group.

Optionally, if the subframes are grouped by adopting Rule 4, the subframes can be grouped in at least one of the following modes:

(1) dividing subframes having predefined odd subframe indexes of the first serving cell into one group, and dividing subframes having predefined even subframe indexes into another group;

(2) dividing subframes having predefined subframe indexes (#0, #1, #5 and #6) of the first serving cell into one group, and dividing the remaining subframes into another group;

(3) dividing predefined first half frames of the first serving cell into one group, and dividing predefined second half frames into another group;

(4) dividing subframes, used for transmitting binding Paging, of the first serving cell into one group, and dividing the remaining subframes into another group;

(5) dividing subframes having predefined subframe indexes (#0 and #5) of the first serving cell into one group, dividing subframes having predefined subframe indexes (#1 and #6) into one group, and dividing the remaining subframes into another group; and (6) dividing N subframes into one group according to a negotiation made between a base station and a terminal in advance, wherein N is a positive integer of greater than or equal to 1.

After the subframes of the first serving cell are grouped in Step S402, a management mode is configured for each of the subframe groups in Step S404.

Optionally, in one embodiment of the disclosure, the step that the management mode is configured for each of the subframe groups includes at least one of the following steps that:

(1) the management mode corresponding to each of the subframe groups is indicated by the signalling;

(2) the base station and the terminal negotiate about the management mode corresponding to each of the subframe groups in advance; and (3) the management mode is determined according to the type of each of the subframe groups.

Optionally, in one embodiment of the disclosure, the management mode includes, but not limited to, at least one of: a scheduling mode, a transmission mode, a sequence generation mode, a scrambling mode, a signal configuration mode and a power control mode.

After the management mode is configured for each of the subframe groups in Step S404, in Step S406, according to the management mode configured for each of the subframe groups, information on the first serving cell is processed.

Optionally, in one embodiment of the disclosure, when each management mode includes the scheduling mode, the step that the information on the first serving cell is processed according to the management mode configured for each of the subframe groups includes that: a PUSCH/PDSCH on the first serving cell is processed according to the scheduling mode of each of the subframe groups.

Optionally, in one embodiment of the disclosure, the step that the PUSCH/PDSCH on the first serving cell is processed according to the scheduling mode of each of the subframe groups may include that:

when the scheduling mode of each of the subframe groups is self-scheduling, a PDCCH/EPDCCH corresponding to the PUSCH/PDSCH, which corresponds to the subframe group of the first serving cell, is detected on a downlink subframe; or when the scheduling mode of each of the subframe groups is cross-carrier scheduling, the PDCCH/EPDCCH is detected on a downlink subframe corresponding to subframe groups of one serving cell other than the first serving cell.

Optionally, in one embodiment of the disclosure, the step that the PUSCH/PDSCH on the first serving cell is processed according to the scheduling mode of each of the subframe groups may further include that: timing is performed on scheduling of the first serving cell and/or HARQ-ACK timing according to reference scheduling timing and/or HARQ-ACK timing, wherein the reference scheduling timing and/or HARQ-ACK timing is scheduling timing and/or HARQ-ACK timing corresponding to the first serving cell, or the reference scheduling timing and/or HARQ-ACK timing is scheduling timing and/or HARQ-ACK timing corresponding to a second serving cell, or the reference scheduling timing and/or HARQ-ACK timing is scheduling timing and/or HARQ-ACK timing except the scheduling timing and/or HARQ-ACK timing corresponding to the first serving cell and the scheduling timing and/or HARQ-ACK timing corresponding to the second serving cell, or the reference scheduling timing and/or HARQ-ACK timing is any HARQ-ACK timing within scheduling timing and/or HARQ-ACK timing corresponding to a current FDD system and a TDD system.

Optionally, when each management mode includes the transmission mode, channels and/or signals on subframes in each of the subframe groups can be processed according to the transmission mode corresponding to each of the subframe groups in Step S406.

Optionally, when each management mode includes the sequence generation mode, channels and/or sequences needed by the channels on subframes in each of the subframe groups can be generated according to the sequence generation mode corresponding to each of the subframe groups in Step S406.

Optionally, when each management mode includes the scrambling mode, signals and/or channels on subframes in each of the subframe groups can be scrambled according to the scrambling mode corresponding to each of the subframe groups in Step S406.

Optionally, when each management mode includes the signal configuration mode, signals on subframes in each of the subframe groups can be configured according to the signal configuration mode corresponding to each of the subframe groups in Step S406.

Optionally, when each management mode includes the power control mode, power setting can be performed on signals/channels on subframes in each of the subframe groups according to a power control parameter corresponding to each of the subframe groups in Step S406.

In one embodiment of the disclosure, the subframes may be downlink subframes or uplink subframes. Moreover, the method can be executed at a terminal side or a base station side.

Optionally, in one embodiment of the disclosure, the step that the information on the first serving cell is processed includes, but not limited to, that: the information on the first serving cell is sent and/or received.

Optionally, in one embodiment of the disclosure, the information on the first serving cell includes, but not limited to: signals and/or channels on the first serving cell.

Optionally, in one embodiment of the disclosure, the first serving cell may be, but not limited to, a scheduled serving cell or a serving cell corresponding to FDD or a secondary serving cell; while the second serving cell may be, but not limited to, a scheduling cell or a serving cell corresponding to TDD or a primary serving cell.

In the method for processing information provided by the embodiments of the disclosure, by grouping the subframes of the serving cell and configuring the management mode for each of the subframe groups, the problem that some downlink subframes in the serving cell cannot be scheduled can be solved, and different requirements of all subframes can be met, thereby improving the performance of the system, and ensuring the efficiency of data transmission.

The technical solutions provided by the embodiments of the disclosure are described below by taking various management modes as examples respectively.

Embodiment 1

In order to facilitate understanding, the embodiment is described by means of specific examples.

Example 1

In the example, downlink subframes of a first serving cell are grouped, a scheduling mode is independently configured for each of the subframe groups, and a terminal receives a PDSCH on the first serving cell according to the scheduling mode of each of the subframe groups.

In the example, dividing the subframes of the first serving cell into the multiple subframe groups refers to group the downlink subframes of the first serving cell according to at least one of the following predefined rules:

Rule 1: dividing the downlink subframes of the first serving cell into the multiple downlink subframe groups according to a subframe attribute of a second serving cell;

Rule 2: dividing the downlink subframes of the first serving cell into the multiple downlink subframe groups according to signalling;

Rule 3: dividing the downlink subframes of the first serving cell into the multiple downlink subframe groups according to subframe types; and Rule 4: dividing the downlink subframes of the first serving cell into the multiple downlink subframe groups according to a predefined subframe set.

Moreover, when the downlink subframes are grouped by adopting Rule 1, downlink subframes of the first serving cell having different attributes from the subframe attribute of uplink subframes of the second serving cell under the same subframe index are divided into one group, and downlink subframes of the first serving cell having the same attribute as the subframe attribute of downlink subframes of the second serving cell under the same subframe index are divided into one group.

Moreover, when the downlink subframes are grouped by adopting Rule 2, the downlink subframes are grouped according to a subframe index, indicated by the received signalling, in each group.

Moreover, when the downlink subframes are grouped by adopting Rule 3, MBSFN subframes can be divided into one group, and Non-MBSFN subframes can be divided into another group; or downlink subframes indicated by an SIB2 are divided into one group, and subframes obtained by switching UL subframes to DL subframes are divided into another group.

Moreover, when the downlink subframes are grouped by adopting Rule 4, the downlink subframes can be grouped in the following modes: dividing subframes having predefined odd subframe indexes into one group, and dividing subframes having predefined even subframe indexes into another group; or dividing subframes having predefined subframe indexes (#0, #1, #5 and #6) into one group, and dividing subframes having predefined subframe indexes (#2, #3, #4, #7, #8 and #9) into another group; or dividing predefined first half frames into one group, and dividing predefined second half frames into another group.

In the example, the scheduling mode can be independently configured for each of the subframe groups in one or more following modes: the scheduling mode corresponding to each downlink subframe group is indicated by the signalling; a base station and a terminal negotiate about the scheduling mode corresponding to each downlink subframe group in advance; and the scheduling mode is determined according to the type of each of the subframe groups.

Moreover, when the terminal receives a PDSCH of the first serving cell according to the scheduling mode of each of the subframe groups and the scheduling mode of each of the subframe groups is self-scheduling, a PDCCH/EPDCCH corresponding to the PDSCH is detected on a downlink subframe corresponding to the subframe group of the first serving cell.

And when the scheduling mode of each of the subframe groups is cross-carrier scheduling, the terminal does not detect the PDCCH/EPDCCH corresponding to the PDSCH on a downlink subframe corresponding to the subframe group of the first serving cell. Moreover, the operation that the terminal does not detect the PDCCH/EPDCCH corresponding to the PDSCH on the downlink subframe corresponding to the subframe group of the first serving cell refers to that: the terminal detects the PDCCH/EPDCCH on the downlink subframe corresponding to the subframe group of any one serving cell other than the first serving cell.

In the embodiment, after the terminal detects the PDCCH or the EPDCCH corresponding to the PDSCH according to the above-mentioned modes, HARQ-ACK timing for the PDSCH of a scheduled serving cell can be performed according to reference HARQ-ACK timing.

Moreover, the first serving cell is the scheduled serving cell; or the first serving cell is a serving cell corresponding to FDD, or the first serving cell is a secondary serving cell.

Moreover, the second serving cell is a scheduling cell, or the second serving cell is a serving cell corresponding to TDD, or the first serving cell is a primary serving cell.

Moreover, the reference HARQ-ACK timing is HARQ-ACK timing corresponding to the first serving cell, or the reference HARQ-ACK timing is HARQ-ACK timing corresponding to the second serving cell, or the reference HARQ-ACK timing is HARQ-ACK timing except the HARQ-ACK timing corresponding to the first serving cell and the HARQ-ACK timing corresponding to the second serving cell, or the reference HARQ-ACK timing is any HARQ-ACK timing within HARQ-ACK timing corresponding to a conventional FDD system and a TDD system.

Example 2

Figure 5:
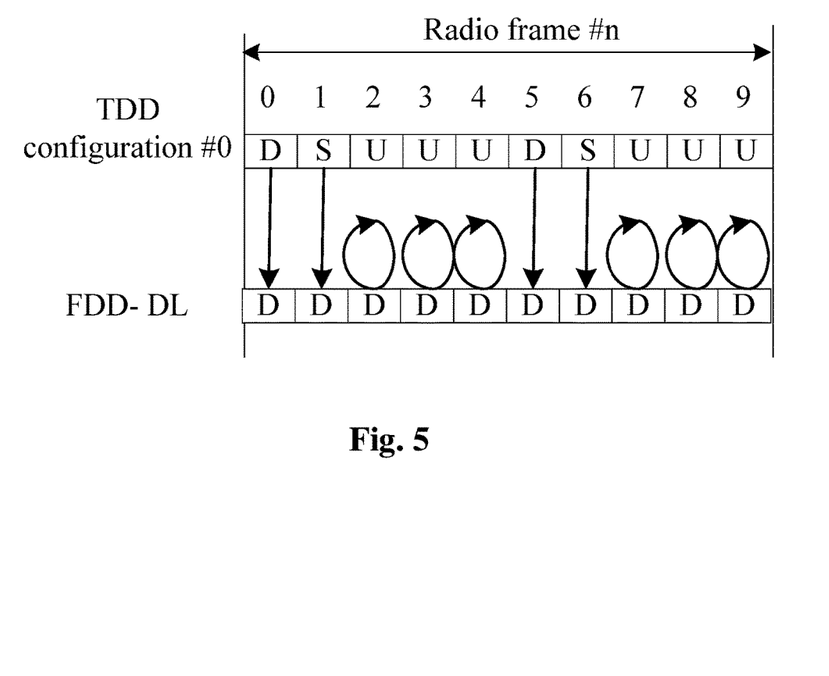
FIG. 5 is a schematic diagram of carrier scheduling of a second example in a first embodiment of the disclosure.

As shown in FIG. 5, in this example, a TDD serving cell of which the uplink-downlink configuration is configuration #0 is aggregated with an FDD serving cell, wherein the TDD serving cell, of which the uplink-downlink configuration is configuration #0, is a primary serving cell.

In the example, downlink subframes on the FDD serving cell are grouped according to Rule 1, downlink subframes of the FDD serving cell corresponding to uplink subframes of the TDD serving cell, of which the uplink-downlink configuration is the configuration #0 under the same subframe index, are divided into one group, namely a downlink subframe group #0 has downlink {subframe #2, subframe #3, subframe #4, subframe #7, subframe #8 and subframe #9}; and downlink subframes of the FDD serving cell corresponding to downlink subframes of the TDD serving cell, of which the uplink-downlink configuration is the configuration #0 under the same subframe index, are divided into one group, namely a downlink subframe group #1 has downlink {subframe #0, subframe #1, subframe #5 and subframe #6}. The base station and the terminal negotiate in advance about that the scheduling mode of the downlink subframe group #0 is self-scheduling and the scheduling mode of the downlink subframe group #1 is cross-carrier scheduling, the terminal detects a PDCCH/EPDCCH corresponding to a PDSCH on the downlink {subframe #2, subframe #3, subframe #4, subframe #7, subframe #8 and subframe #9} of the FDD serving cell on downlink subframes corresponding to the downlink subframe group #0 of the FDD serving cell and detects a PDCCH/EPDCCH corresponding to a PDSCH on the downlink {subframe #0, subframe #1, subframe #5 and subframe #6} on downlink subframes corresponding to the downlink subframe group #1 of the TDD serving cell of which the uplink-downlink configuration is the configuration #0, the HARQ-ACK timing corresponding to the PDSCH on the FDD serving cell is determined according to reference configurations, the reference configurations refer to that the PDSCH is detected on a subframe n and an HARQ-ACK response of the PDSCH is sent on a subframe n-k, and k can be valued with reference to Table 3.

TABLE 3

| Uplink-downlink configuration of TDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | — | 5, 4 | — | — | 6, 5, 4 | — | 5, 4 |
| 1 | — | — | 7, 6, 5 | 5, 4 | — | — | — | 7, 6, 5 | 5, 4 | — |
| 2 | — | — | 8, 7, 5, 4, 6 | — | — | — | — | 8, 7, 5, 4, 6 | — | — |
| 3 | — | — | 10, 9, 8, 11 | 8, 7, 6 | 6, 5, 4 | — | — | — | — | — |
| 4 | — | — | 12, 10, 9, 8, 11 | 8, 6, 5, 4; 7 | — | — | — | — | — | — |

TABLE 3-continued

| Uplink-downlink configuration of TDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 10, 9, 8, 7, 5, 4, 11, 6 | — | — | — | — | — | — | — |
| 6 | — | — | 8, 7 | 6, 7 | 6, 5 | — | — | 7, 6 | 5, 4 | — |

Example 3

As shown in FIG. 5, in the example, a TDD serving cell of which a uplink-downlink configuration is configuration #0 is aggregated with a TDD serving cell of which a uplink-downlink configuration is configuration #1, wherein the TDD serving cell of which the uplink-downlink configuration is the configuration #0 is a primary serving cell.

In the example, downlink subframes of the TDD serving cell, of which the uplink-downlink configuration is the configuration #1, are grouped according to Rule 2. Signalling indicates that a downlink subframe group #0 has downlink {subframe #4 and subframe #9} and a downlink subframe group #1 has downlink {subframe #0, subframe #1, subframe #5 and subframe #6}, and the signalling indicates that a scheduling mode of the downlink subframe group #0 is self-scheduling and a scheduling mode of the downlink subframe group #1 is cross-carrier scheduling, so the terminal detects a PDCCH/EPDCCH corresponding to a PDSCH on the downlink {subframe #4 and subframe #9} of the TDD serving cell of which the uplink-downlink configuration is the configuration #1 on downlink subframes corresponding to the downlink subframe group #0 of the TDD serving cell of which the uplink-downlink configuration is the configuration #1, and detects a PDCCH/EPDCCH corresponding to a PDSCH on the downlink subframe #0, subframe #1, subframe #5 and subframe #61 on downlink subframes corresponding to the downlink subframe group #1 of the TDD serving cell of which the uplink-downlink configuration is the configuration #0.

Example 4

As shown in FIG. 5, in the example, a TDD serving cell of which a uplink-downlink configuration is configuration #0 is aggregated with a TDD serving cell of which a uplink-downlink configuration is configuration #1, wherein the TDD serving cell of which the uplink-downlink configuration is the configuration #0 is a primary serving cell.

In the example, downlink subframes of the TDD serving cell, of which the uplink-downlink configuration is the configuration #1, are grouped according to Rule 3. Signalling indicates that a downlink subframe group #0 has downlink {subframe #4 and subframe #9} and a downlink subframe group #1 has downlink {subframe #0, subframe #1, subframe #5 and subframe #6}, and the signalling indicates that a scheduling mode of the downlink subframe group #0 is self-scheduling and a scheduling mode of the downlink subframe group #1 is cross-carrier scheduling, so the terminal detects a PDCCH/EPDCCH corresponding to a PDSCH on the downlink {subframe #4 and subframe #9} of the TDD serving cell of which the uplink-downlink configuration is the configuration #1 on downlink subframes corresponding to the downlink subframe group #0 of the TDD serving cell of which the uplink-downlink configuration is the configuration #1, and detects a PDCCH/EPDCCH corresponding to a PDSCH on the downlink subframe #0, subframe #1, subframe #5 and subframe #6} on downlink subframes corresponding to the downlink subframe group #0 of the TDD serving cell of which the uplink-downlink configuration is the configuration #0.

Embodiment 2

In order to facilitate understanding, the embodiment is described by means of specific examples.

Example 1

In the example, uplink subframes of a first serving cell are grouped, a scheduling mode is independently configured for each of the subframe groups, and a terminal sends a PUSCH on the first serving cell according to the scheduling mode of each of the subframe groups.

In the example, the uplink subframes of the first serving cell can be grouped according to at least one of the following rules:

Rule 1: dividing the uplink subframes of the first serving cell into the multiple uplink subframe groups according to a subframe attribute of a second serving cell;

Rule 2: dividing the uplink subframes of the first serving cell into the multiple uplink subframe groups according to signalling; and Rule 3: dividing the uplink subframes of the first serving cell into the multiple uplink subframe groups according to a predefined subframe set.

Moreover, when the uplink subframes are grouped by adopting Rule 1, uplink subframes of the first serving cell having different attributes from the subframe attribute of downlink subframes of the second serving cell under the same subframe index can be divided into one group, and uplink subframes of the first serving cell having the same attribute from the subframe attribute of uplink subframes of the second serving cell under the same subframe index can be divided into another group.

Moreover, when the uplink subframes are grouped by adopting Rule 2, the uplink subframes can be grouped according to a subframe index, indicated by the signalling, in each group.

Moreover, when the uplink subframes are grouped by adopting Rule 3, subframes having predefined odd subframe indexes can be divided into one group, and subframes having predefined even subframe indexes can be divided into another group; or subframes having predefined subframe indexes (#0, #1, #5 and #6) are divided into one group, and subframes having predefined subframe indexes (#2, #3, #4, #7, #8 and #9) are divided into another group; or predefined first half frames are divided into one group, and predefined second half frames are divided into another group.

In the example, the scheduling mode can be independently configured for each of the subframe groups in one or the combination of the following modes that: the scheduling mode corresponding to each uplink subframe group is indicated by the signalling; or a base station and a terminal negotiate about the scheduling mode corresponding to each uplink subframe group, or the scheduling mode is determined according to the type of each of the subframe groups in advance.

Moreover, the operation that the terminal sends a PUSCH of the first serving cell according to the scheduling mode of each of the subframe groups may refer to that: when a scheduling mode of each of the subframe groups is self-scheduling, the terminal detects a PDCCH/EPDCCH corresponding to the PUSCH on a downlink subframe corresponding to the subframe group of the first serving cell.

In addition, the operation that the terminal sends the PUSCH of the first serving cell according to the scheduling mode of each of the subframe groups may refer to that: when a scheduling mode of each of the subframe groups is cross-carrier scheduling, the terminal does not detect the PDCCH/EPDCCH corresponding to the PUSCH on the downlink subframe corresponding to the subframe group of the first serving cell.

Moreover, the operation that the terminal does not detect the PDCCH/EPDCCH corresponding to the PUSCH on the downlink subframe, which corresponds to the subframe groups of the first serving cell, may refer to that: the terminal detects the PDCCH/EPDCCH on the downlink subframe corresponding to subframe groups of any one serving cell other than the first serving cell.

Furthermore, the operation that the terminal sends the PUSCH of the first serving cell according to the scheduling mode of each of the subframe groups may further include that: scheduling timing/HARQ-ACK timing for the PUSCH of a scheduled serving cell is in accordance with reference scheduling timing/HARQ-ACK timing, wherein, the first serving cell is the scheduled serving cell; or the first serving cell is a serving cell corresponding to FDD, or the first serving cell is a secondary serving cell.

Moreover, the second serving cell is a scheduling cell, or the second serving cell is a serving cell corresponding to TDD, or the second serving cell is a primary serving cell.

Moreover, the reference scheduling timing/HARQ-ACK timing can be scheduling timing/HARQ-ACK timing corresponding to the first serving cell, or the reference scheduling timing/HARQ-ACK timing is scheduling timing/HARQ-ACK timing corresponding to the second serving cell, or the reference scheduling timing/HARQ-ACK timing is scheduling timing/HARQ-ACK timing except the scheduling timing/HARQ-ACK timing corresponding to the first serving cell and the scheduling timing/HARQ-ACK timing corresponding to the second serving cell, or the reference scheduling timing/HARQ-ACK timing is any scheduling timing/HARQ-ACK timing within scheduling timing/HARQ-ACK timing corresponding to a conventional FDD system and a TDD system, or the reference scheduling timing/HARQ-ACK timing is scheduling timing/HARQ-ACK timing of which Round Trip Time (RTT) is 10 ms.

Example 2

Figure 6:
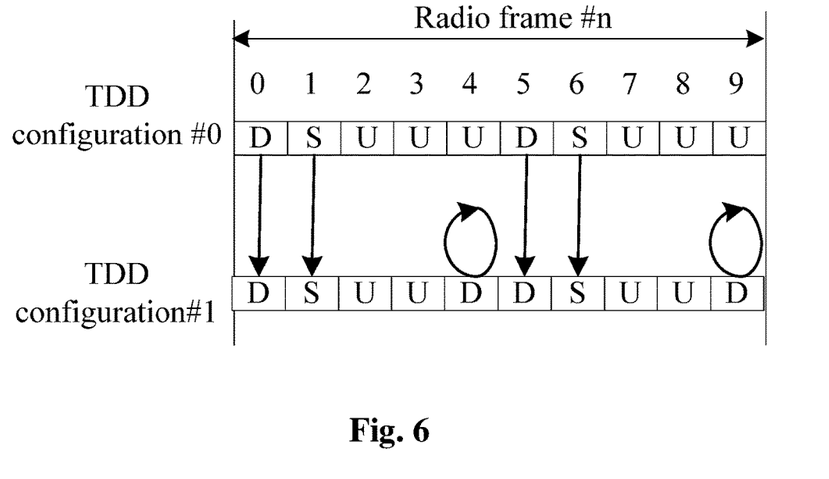
FIG. 6 is a schematic diagram of carrier scheduling of a third example in a first embodiment of the disclosure.
Figure 7:
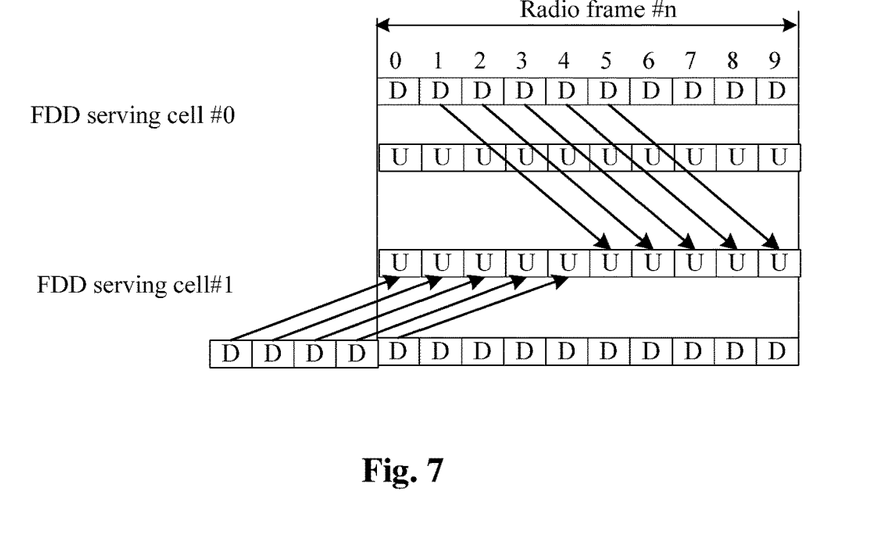
FIG. 7 is a schematic diagram of carrier scheduling of a second example in a second embodiment of the disclosure.

As shown in FIG. 6, in the example, an FDD serving cell #0 and an FDD serving cell #1 are aggregated, wherein the FDD serving cell #0 is a primary serving cell.

In the example, uplink subframes of the FDD serving cell #1 are grouped according to Rule 3 in Example 1. It is predefined that an uplink subframe group #0 has uplink {subframe #0, subframe #1, subframe #2, subframe #3 and subframe #4} and an uplink subframe group #1 has uplink {subframe #5, subframe #6, subframe #7, subframe #8 and subframe #9}, and signalling indicates that a scheduling mode of the uplink subframe group #0 is self-scheduling and a scheduling mode of the uplink subframe group #1 is cross-carrier scheduling, so for uplink subframes of the FDD serving cell #1, the terminal detects a PDCCH/EPDCCH corresponding to a PUSCH on uplink {subframe #0, subframe #1, subframe #2, subframe #3 and subframe #4} on downlink subframes, which correspond to the uplink subframe group #0 of the FDD serving cell #1, and detects a PDCCH/EPDCCH corresponding to a PUSCH on uplink {subframe #5, subframe #6, subframe #7, subframe #8 and subframe #9} on downlink subframes, which correspond to the uplink subframe group #1 of the FDD serving cell #0. Scheduling timing/HARQ-ACK timing is adopted for the PUSCH on the FDD serving cell #1 according to reference configurations which refer to scheduling timing/HARQ-ACK timing for FDD.

Embodiment 3

In order to facilitate understanding, the embodiment is described by means of specific examples.

Example 1

In the example, uplink subframes of a first serving cell are grouped, a transmission mode is independently configured for each of the subframe groups, and then a terminal sends a PDCCH/EPDCCH and a PUSCH on a first serving cell according to the transmission mode of each of the subframe groups.

In the example, the uplink subframes of the first serving cell can be grouped according to the predefined Rule 2, namely according to signalling.

Moreover, the operation that the uplink subframes of the first serving cell can be grouped according to the signalling may refer to, but not limit to, that: the signalling indicates a subframe index in each group, namely the signalling indicates that a first half frame is a subframe group #0 and a second half frame is a subframe group #1.

In the example, the operation that the transmission mode is independently configured for each of the subframe groups may refer to, but not limit to, that: a base station and the terminal negotiate about the transmission mode corresponding to each downlink subframe group in advance. For example, a transmission mode of the subframe group #0 is a single-antenna mode, and a transmission mode of the subframe group #1 is a multi-antenna mode.

In the example, the operation that the terminal sends the PDCCH/EPDCCH and the PUSCH on the first serving cell according to the transmission mode of each of the subframe groups may refer to, but not limit to, that: if the transmission mode of the subframe group #0 is a single-antenna transmission mode, the terminal sends the PUSCH on the first serving cell according to an uplink subframe corresponding to the subframe group #0 in the single-antenna transmission mode; and if the transmission mode of the subframe group #1 is a multi-antenna transmission mode, the terminal sends the PUSCH on the first serving cell according to an uplink subframe corresponding to the subframe group #1 in the multi-antenna transmission mode.

Moreover, in the example, the first serving cell is a scheduled serving cell, or the first serving cell is a serving cell corresponding to FDD, or the first serving cell is a secondary serving cell.

Example 2

In the example, downlink subframes of a first serving cell are grouped, a transmission mode is independently configured for each of the subframe groups, and then a terminal sends a PDCCH/EPDCCH and/or a PDSCH and/or a Cell Reference Signal (CRS) and/or a Demodulation Reference Signal (DMRS) and/or a Channel State Indication Reference Signal (CSI-RS) on the first serving cell according to the transmission mode of each of the subframe groups.

Furthermore, in the example, the downlink subframes of the first serving cell can be grouped according to the predefined Rule 2, namely according to signalling.

Moreover, the operation that the downlink subframes of the first serving cell can be grouped according to the signalling may refer to, but not limit to, that: the signalling indicates a subframe index in each group, namely the signalling indicates that a first half frame is a subframe group #0 and a second half frame is a subframe group #1.

The operation that the transmission mode is independently configured for each of the subframe groups may refer to, but not limit to, that: the base station and the terminal negotiate about the transmission mode corresponding to each downlink subframe group in advance. Namely, a transmission mode of the subframe group #0 is a single-antenna mode, and a transmission mode of the subframe group #1 is a transmission diversity mode.

The operation that the terminal sends the PDCCH/EPDCCH and/or the PDSCH and/or the CRS and/or the DMRS and/or the CSI-RS on the first serving cell according to the transmission mode of each of the subframe groups may refer to, but not limit to, that: if a transmission mode of the subframe group #0 is a single-antenna transmission mode, the terminal receives the PDCCH/EPDCCH and/or the PDSCH and/or the CRS and/or the DMRS and/or the CSI-RS on the first serving cell on a downlink subframe corresponding to the subframe group #0 according to the single-antenna transmission mode; and if a transmission mode of the subframe group #0 is a multi-antenna transmission mode, the terminal receives the PDCCH/EPDCCH and/or the PDSCH and/or the CRS and/or the DMRS and/or the CSI-RS on the first serving cell on a downlink subframe corresponding to the subframe group #1 according to the multi-antenna transmission mode.

Moreover, the first serving cell is a scheduled serving cell, or the first serving cell is a serving cell corresponding to FDD, or the first serving cell is a secondary serving cell.

Embodiment 4

In order to facilitate understanding, the embodiment is described by means of specific examples.

Example 1

In the example, uplink subframes of a first serving cell are grouped, a sequence generation mode is independently configured for each of the subframe groups, and a terminal generates and sends a sequence needed by a PUCCH on the first serving cell according to the sequence generation mode of each of the subframe groups.

In the example, the uplink subframes of the first serving cell can be grouped according to the predefined Rule 4, namely according to a predefined subframe index.

Moreover, the operation that the uplink subframes of the first serving cell are grouped according to the predefined subframe index may refer to, but not limit to, that: a subframe group #0 has an odd subframe index, and a subframe group #1 has an even subframe index.

The operation that the sequence generation mode is independently configured for each of the subframe groups may refer to, but not limit to, that: a base station and the terminal negotiate about a generation mode of a sequence needed by a PUCCH on each uplink subframe group in advance, namely a generation mode of a sequence needed by a PUCCH corresponding to the subframe group #0 is A, and a generation mode of a sequence needed by a PUCCH corresponding to the subframe group #1 is B. A difference between the sequence generation mode A and the sequence generation mode B refers to generation of the sequences needed by the PUCCHs according to different cell indexes.

When the terminal generates and sends the sequence needed by the PUCCH on the first serving cell according to the sequence generation mode of each of the subframe groups, if the generation mode of the sequence needed by the PUCCH corresponding to the subframe group #0 is A, the terminal generates the sequence needed by the PUCCH corresponding to the subframe group #0 according to the sequence generation mode A; and if the generation mode of the sequence needed by the PUCCH corresponding to the subframe group #1 is B, the terminal generates the sequence needed by the PUCCH corresponding to the subframe group #1 according to the sequence generation mode B.

Furthermore, in the example, the first serving cell may be a scheduled serving cell, a serving cell corresponding to FDD, or a secondary serving cell.

Example 2

In the example, downlink subframes of a first serving cell are grouped, and a sequence generation mode is independently configured for each of the subframe groups; and a base station generates a sequence needed by an EPDCCH and/or a PDSCH and/or a CRS and/or a DM RS and/or a CSI-RS on the first serving cell according to the sequence generation mode of each of the subframe groups.

In the example, the downlink subframes of the first serving cell can be grouped according to the predefined Rule 4, namely according to a predefined subframe index.

Moreover, the operation that the downlink subframes of the first serving cell are grouped according to the predefined subframe index may refer to, but not limit to, that: a subframe group #0 has an odd subframe index, and a subframe group #1 has an even subframe index.

The operation that the sequence generation mode is independently configured for each of the subframe groups may refer to, but not limit to, that: the base station and the terminal negotiate about a generation mode of a sequence needed by an EPDCCH and/or a PDSCH and/or a CRS and/or a DM RS and/or a CSI-RS on each downlink subframe group in advance, namely a generation mode of a sequence needed by an EPDCCH and/or a PDSCH and/or a CRS and/or a DM RS and/or a CSI-RS corresponding to the subframe group #0 is A, and a generation mode of a sequence needed by an EPDCCH and/or a PDSCH and/or a CRS and/or a DM RS and/or a CSI-RS corresponding to the subframe group #1 is B. And a difference between the sequence generation mode A and the sequence generation mode B refers to generation of the needed sequences according to different cell indexes.

When the base station generates the sequence needed by the EPDCCH and/or the PDSCH and/or the CRS and/or the DM RS and/or the CSI-RS on the first serving cell according to the sequence generation mode of each of the subframe groups, if the generation mode of the sequence needed by the EPDCCH and/or the PDSCH and/or the CRS and/or the DM RS and/or the CSI-RS corresponding to the subframe group #0 is A, the base station generates the sequence needed by the EPDCCH and/or the PDSCH and/or the CRS and/or the DM RS and/or the CSI-RS corresponding to the subframe group #0 according to the sequence generation mode A; and if the generation mode of the sequence needed by the EPDCCH and/or the PDSCH and/or the CRS and/or the DM RS and/or the CSI-RS corresponding to the subframe group #1 is B, the base station generates the sequence needed by the EPDCCH and/or the PDSCH and/or the CRS and/or the DM RS and/or the CSI-RS corresponding to the subframe group #1 according to the sequence generation mode B.

Furthermore, in the example, the first serving cell may be a scheduled serving cell, a serving cell corresponding to FDD, or a secondary serving cell.

Embodiment 5

In order to facilitate understanding, the embodiment is described by means of specific examples.

Example 1

In the example, downlink subframes of a first serving cell are grouped, a scrambling mode is independently configured for each of the subframe groups, and a terminal sends channels and/or signals on the first serving cell according to the scrambling mode of each of the subframe groups.

In the example, the downlink subframes of the first serving cell can be grouped according to the predefined Rule 3, namely according to subframe types.

Moreover, the operation that the downlink subframes of the first serving cell are grouped according to the subframe types may refer to, but not limit to, that: MBSFN subframes are divided into a subframe group #0, and non-MBSFN subframes are divided into a subframe group #1.

The operation that the scrambling mode is independently configured for each of the subframe groups may refer to, but not limit to, that: a scrambling mode of channels and/or signals on each downlink subframe group is determined according to the subframe types, namely a scrambling mode of channels and/or signals corresponding to the subframe group #0 is A, and a scrambling mode of channels and/or signals corresponding to the subframe group #1 is B.

In the example, when the terminal sends the channels and/or the signals on the first serving cell according to the scrambling mode of each of the subframe groups, if the scrambling mode of the channels and/or the signals corresponding to the subframe group #0 is A, the terminal sends the channels and/or the signals corresponding to the subframe group #0 according to the scrambling mode A; and if the scrambling mode of the channels and/or the signals corresponding to the subframe group #1 is B, the terminal sends the channels and/or the signals corresponding to the subframe group #1 according to the scrambling mode B.

Moreover, in the example, the first serving cell may be a scheduled serving cell, a serving cell corresponding to FDD, or a secondary serving cell.

Example 2

In the example, uplink subframes of a first serving cell are grouped, and a scrambling mode is independently configured for each of the subframe groups; and a terminal sends a PUSCH on the first serving cell according to the scrambling mode of each of the subframe groups.

In the example, downlink subframes of the first serving cell can be grouped according to the predefined Rule 4, namely according to a predefined subframe set. First half frames are divided into an uplink subframe group #0, and second half frames are divided into an uplink subframe group #1.

The operation that the scrambling mode is independently configured for each of the subframe groups may refer to, but not limit to, that: a scrambling mode of a PUSCH on each uplink subframe group is determined according to a mode negotiated between a base station and an UE in advance, namely a scrambling mode of a PUSCH corresponding to the uplink subframe group #0 is A, and a scrambling mode of a PUSCH corresponding to the uplink subframe group #1 is B, wherein a difference between the scrambling mode A and the scrambling mode B refers to generation of scrambling sequences by using different cell indexes.

When the terminal sends the PUSCH on the first serving cell according to the scrambling mode of each of the subframe groups, if the scrambling mode of the PUSCH corresponding to the uplink subframe group #0 is A, the terminal sends the PUSCH corresponding to the uplink subframe group #0 according to the scrambling mode A; and if the scrambling mode of the PUSCH corresponding to the uplink subframe group #1 is B, the terminal sends the PUSCH corresponding to the uplink subframe group #1 according to the scrambling mode B.

Moreover, in the example, the first serving cell may be a scheduled serving cell, a serving cell corresponding to FDD, or a secondary serving cell.

Embodiment 6

In order to facilitate understanding, the embodiment is described by means of specific examples.

Example 1

In the example, uplink subframes of a first serving cell are grouped, a signal configuration mode is independently configured for each of the subframe groups, and a terminal sends signals on the first serving cell according to the signal configuration mode of each of the subframe groups.

In the example, the uplink subframes of the first serving cell can be grouped according to the predefined Rule 3, namely according to subframe types.

Moreover, the operation that downlink subframes of the first serving cell are grouped according to the subframe types may refer to, but not limit to, that: fixed uplink subframes are divided into a subframe group #0, and flexible uplink subframes are divided into a subframe group #1.

The operation that the signal configuration mode is independently configured for each of the subframe groups may refer to, but not limit to, that: a signal configuration mode of signals on each downlink subframe group is determined according to the subframe types, namely a signal configuration mode of signals corresponding to the subframe group #0 is A, and a signal configuration mode of signals corresponding to the subframe group #1 is B.

When the terminal sends the signals on the first serving cell according to the signal configuration mode of each of the subframe groups, if the signal configuration mode of the signals corresponding to the subframe group #0 is A, the terminal sends the signals corresponding to the subframe group #0 according to the signal configuration mode A; and if the signal configuration mode of the signals corresponding to the subframe group #1 is B, the terminal sends the signals corresponding to the subframe group #1 according to the signal configuration mode B.

Moreover, in the example, the first serving cell may be a scheduled serving cell, a serving cell corresponding to FDD, or a secondary serving cell.

Example 2

In the example, uplink subframes of an FDD serving cell are grouped, a Sounding Reference Signal (SRS) configuration mode is independently configured for each of the subframe groups, and a terminal sends SRSs on a first serving cell according to the SRS configuration mode of each of the subframe groups.

In the example, the uplink subframes of the FDD serving cell are grouped according to the predefined Rule 4, namely according to a predefined subframe index.

Moreover, the operation that the uplink subframes of the FDD serving cell are grouped according to the predefined subframe index may refer to, but not limit to, that: uplink subframes having an odd subframe index are divided into a subframe group #0, namely the subframe group #0 is composed of {subframe #1, subframe #3, subframe #5 and subframe #9}; and uplink subframes having an even subframe index are divided into a subframe group #1, namely the subframe group #1 is composed of {subframe #0, subframe #2, subframe #4, subframe #6 and subframe #8}.

The operation that the signal configuration mode is independently configured for each of the subframe groups may refer to, but not limit to, that: an SRS configuration mode of signals on each downlink subframe group is determined according to signalling, namely a configuration mode of SRSs corresponding to the subframe group #0 is A, and a configuration mode of SRSs corresponding to the subframe group #1 is B, wherein the SRS configuration mode A refers to that an SRS period is 5 ms, and the SRS configuration mode B refers to that an SRS period is 10 ms.

When the terminal sends the SRSs on the FDD serving cell according to the SRS configuration mode of each of the subframe groups, if the configuration mode of the SRSs corresponding to the subframe group #0 is A, the terminal sends the SRSs corresponding to the subframe group #0 according to the SRS period (5 ms); and if the signal configuration mode of the signals corresponding to the subframe group #1 is B, the terminal sends the SRSs corresponding to the subframe group #1 according to the SRS period (10 ms).

It needs to be noted that although each of the embodiments is described by means of a separate management mode, it is not limited thereto, all the embodiments can be combined so as to obtain a new implementation mode, and detailed descriptions are no longer made in the embodiments of the disclosure specifically.

In correspondence to the method for processing information of a serving cell, an embodiment of the disclosure also provides a device for processing information of a serving cell, which are configured to implement the method for processing information of a serving cell.

Figure 8:
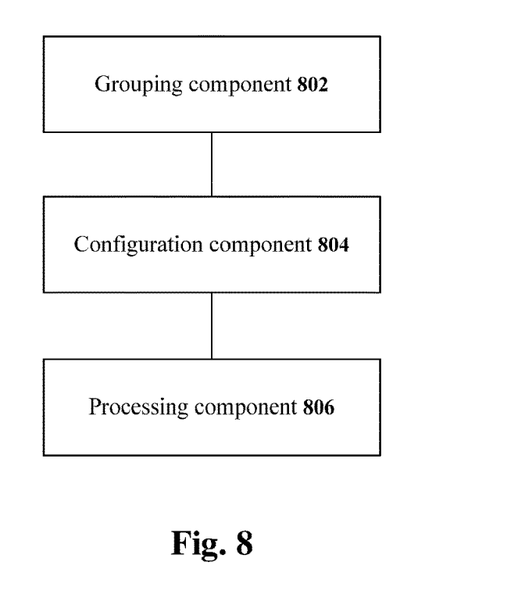
FIG. 8 is a structural schematic diagram of a device for processing information according to an embodiment of the disclosure.

FIG. 8 is a structural schematic diagram of a device for processing information according to an embodiment of the disclosure. As shown in FIG. 8, the device for processing information according to the embodiment of the disclosure includes a grouping component 802, a configuration component 804 and a processing component 806. It should be understood that a connecting relationship between all components shown in FIG. 8 is only an example. Those skilled in the art can adopt other connecting relationships absolutely as long as functions of all components in the disclosure can be achieved under the connecting relationships.

In the description, the functions of all components can be achieved by using specific hardware or hardware capable of being combined with appropriate software to execute processing. The hardware or the specific hardware may include an Application Specific Integrated Circuit (ASIC), various other circuits, various processes and the like. When the functions are achieved by the processors, the functions can be provided by a single specific processor, a single shared processor or a plurality of independent processors, some processors thereamong being probably shared. In addition, the processors should not be interpreted as specific hardware capable of executing software, and may impliedly include, but not limited to, Digital Signal Processor (DSP) hardware, a Read-Only Memory (ROM) configured to store software, a Random Access Memory (RAM) and a non-volatile storage device instead.

In FIG. 8, the grouping component 802 is configured to divide subframes of a first serving cell into multiple subframe groups according to a predefined rule; the configuration component 804 is configured to configure a management mode for each of the subframe groups; and the processing component 806 is configured to process information on the first serving cell according to the management mode configured for each of the subframe groups.

In a specific implementation process, the device for processing information of a serving cell according to the embodiment of the disclosure can adopt an optional implementation mode corresponding to the method for processing information of a serving cell, and detailed descriptions are no longer made specifically.

The device for processing information of a serving cell according to the embodiments of the disclosure is located at a terminal or a base station.

From the above descriptions, it can be seen that by means of the technical solutions provided by one of the embodiments, the subframes of the serving cell are grouped, and the management mode is configured for each of the subframe groups, so that the problem that some downlink subframes in the serving cell cannot be scheduled can be solved, and different requirements of different subframes can be met, thereby improving the performance of the system, and ensuring the efficiency of data transmission.

Obviously, those skilled in the art should understand that all components or all steps in the disclosure can be realized by using a general calculation device, can be centralized on a single calculation device or can be distributed on a network composed of a plurality of calculation devices. Optionally, they can be realized by using executable program codes of the calculation devices. Thus, they can be stored in a storage device and executed by the calculation devices, the shown or described steps can be executed in a sequence different from this sequence under certain conditions, or they are manufactured into each integrated circuit component respectively, or a plurality of components or steps therein are manufactured into a single integrated circuit component. Thus, the disclosure is not limited to a combination of any specific hardware and software.

The above is only the example embodiments of the disclosure, and is not intended to limit the disclosure. There can be various modifications and variations in the disclosure for those skilled in the art. Any modifications, equivalent replacements, improvements and the like within the spirit and principle of the disclosure shall fall within the protection scope of the disclosure.

What is claimed is:

1. A method for processing information, comprising:
   dividing subframes of a first serving cell into multiple subframe groups according to a predefined rule;
   configuring a management mode for each of the subframe groups; and
   processing information on the first serving cell according to the management mode configured for each of the subframe groups;
   wherein the predefined rule comprises at least one of: dividing the subframes of the first serving cell into the multiple subframe groups according to a subframe attribute of a second serving cell; dividing the subframes of the first serving cell into the multiple subframe groups according to signalling; dividing the subframes of the first serving cell into the multiple subframe groups according to subframe types; and dividing the subframes of the first serving cell into the multiple subframe groups according to a predefined subframe set.

2. The method as claimed in claim 1, wherein dividing the subframes of the first serving cell into the multiple subframe groups according to the subframe attribute of the second serving cell comprises: dividing subframes of the first serving cell, having the same attribute as the subframe attribute of the second serving cell, under the same subframe index into one group, and dividing subframes of the first serving cell, having different attributes from the subframe attribute of the second serving cell, under the same subframe index into another group.

3. The method as claimed in claim 1, wherein dividing the subframes of the first serving cell into the multiple subframe groups according to the signalling comprises: dividing the subframes of the first serving cell into the multiple subframe groups according to a subframe index, indicated in the signalling, of each group.

4. The method as claimed in claim 1, wherein dividing the subframes of the first serving cell into the multiple subframe groups according to the subframe types comprises one of:
   dividing Multicast Broadcast Single Frequency Network, MBSFN, subframes of the first serving cell into one group, and dividing non-MBSFN subframes of the first serving cell into another group;
   dividing downlink subframes, indicated by a System Information Block 2, SIB2, of the first serving cell into one group, and dividing subframes obtained by switching uplink subframes to downlink subframes into another group; and
   dividing flexible subframes of the first serving cell into one group, and dividing fixed subframes into another group.

5. The method as claimed in claim 1, wherein dividing the subframes of the first serving cell into the multiple subframe groups according to the predefined subframe set comprises one of:
   dividing subframes having predefined odd subframe indexes of the first serving cell into one group, and dividing subframes having even subframe indexes into another group;
   dividing subframes having predefined subframe indexes (#0, #1, #5 and #6) of the first serving cell into one group, and dividing the remaining subframes into another group;
   dividing predefined first half frames of the first serving cell into one group, and dividing predefined second half frames of the first serving cell into another group;
   dividing subframes, used for transmitting binding Paging, of the first serving cell into one group, and dividing the remaining subframes into another group;
   dividing subframes having predefined subframe indexes (#0 and #5) of the first serving cell into one group, dividing subframes having predefined subframe indexes (#1 and #6) into one group, and dividing the remaining subframes into another group; and
   dividing N subframes into one group according to a negotiation made between a base station and a terminal in advance, wherein N is a positive integer of greater than or equal to 1.

6. The method as claimed in claim 1, wherein configuring the management mode for each of the subframe groups comprises at least one of:
   indicating the management mode corresponding to each of the subframe groups by signaling;
   negotiating about the management mode corresponding to each of the subframe groups between a base station and a terminal in advance; and
   determining the management mode corresponding to each of the subframe groups according to a type of each of the subframe groups.

7. The method as claimed in claim 1, wherein the management mode comprises at least one of: a scheduling mode, a transmission mode, a sequence generation mode, a scrambling mode, a signal configuration mode and a power control mode.

8. The method as claimed in claim 7, wherein when the management mode comprises the scheduling mode, processing the information on the first serving cell according to the management mode configured for each of the subframe groups comprises: processing a Physical Uplink Shared Channel, PUSCH/Physical Downlink Shared Channel, PDSCH, on the first serving cell according to the scheduling mode of each of the subframe groups.

9. The method as claimed in claim 8, wherein processing the PUSCH/PDSCH on the first serving cell according to the scheduling mode of each of the subframe groups comprises:
   when the scheduling mode of each of the subframe groups is self-scheduling, detecting a PDCCH/Enhanced PDCCH, EPDCCH, corresponding to the PUSCH/PDSCH on a downlink subframe, which corresponds to each of the subframe groups of the first serving cell; or
   when the scheduling mode of each of the subframe groups is cross-carrier scheduling, detecting the PDCCH/EPDCCH on a downlink subframe corresponding to subframe groups of one serving cell other than the first serving cell.

10. The method as claimed in claim 9, wherein processing the PUSCH/PDSCH on the first, serving cell according to the scheduling mode of each of the subframe groups further comprises:
   performing timing on scheduling of the first serving cell and/or Hybrid Automatic Repeat reQuest-Acknowledged, HARQ-ACK, timing according to reference scheduling timing and/or HARQ-ACK timing, wherein the reference scheduling timing and/or HARQ-ACK timing is scheduling timing and/or HARQ-ACK timing corresponding to the first serving cell, or the reference scheduling timing and/or HARQ-ACK timing is scheduling timing and/or HARQ-ACK timing corresponding to the second serving cell, or the reference scheduling timing and/or HARQ-ACK timing is scheduling timing and/or HARQ-ACK timing except the scheduling timing and/or HARQ-ACK timing corresponding to the first serving cell and the scheduling timing and/or HARQ-ACK timing corresponding to the second serving cell, or the reference scheduling timing and/or HARQ-ACK timing is any HARQ-ACK timing within scheduling timing and/or HARQ-ACK timing corresponding to a current Frequency Division Duplex, FDD, system and a Time Division Duplex, TDD, system.

11. The method as claimed in claim 7, wherein when the management mode comprises the transmission mode, processing the information on the first serving cell according to the management mode configured for each of the subframe groups comprises: processing channels and/or signals on subframes in each of the subframe groups according to the transmission mode corresponding to each of the subframe groups.

12. The method as claimed in claim 7, wherein when the management mode comprises the sequence generation mode, processing the information on the first serving cell according to the management mode configured for each of the subframe groups comprises: generating channels and/or sequences needed by the channels on subframes in each of the subframe groups according to the sequence generation mode corresponding to each of the subframe groups.

13. The method as claimed in claim 7, wherein when the management mode comprises the scrambling mode, processing the information on the first serving cell according to the management mode configured for each of the subframe groups comprises: scrambling signals and/or channels on subframes in each of the subframe groups according to the scrambling mode corresponding to each of the subframe groups.

14. The method as claimed in claim 7, wherein when the management mode comprises the signal configuration mode, processing the information on the first serving cell according to the management mode configured for each of the subframe groups comprises: configuring signals on subframes in each of the subframe groups according to the signal configuration mode corresponding to each of the subframe groups.

15. The method as claimed in claim 7, wherein when each management mode comprises the power control mode, processing the information on the first serving cell according to the management mode configured for each of the subframe groups comprises: performing power setting on signals/channels on subframes in each of the subframe groups according to a power control parameter corresponding to each of the subframe groups.

16. The method as claimed in claim 1, wherein the subframes comprise downlink subframes and/or uplink subframes; or, processing the information on the first serving cell comprises: sending and/or receiving the information on the first serving cell; or, the information on the first serving cell comprises: signals and/or channels on the first serving cell; or, the first serving cell comprises at least one of: a scheduled serving cell; a serving cell corresponding to FDD; and a secondary serving cell.

17. The method as claimed in claim 1, wherein the second serving cell comprises at least one of: a scheduling cell; a serving cell corresponding to TDD; and a primary serving cell.

18. A device for processing information, comprising:
a grouping component, configured to divide subframes of a first serving cell into multiple subframe groups according to a predefined rule;
a configuration component, configured to configure a management mode for each of the subframe groups; and
a processing component, configured to process information on the first serving cell according to the management mode configured for each of the subframe groups;
wherein the predefined rule comprises at least one of:
dividing the subframes of the first serving cell into the multiple subframe groups according to a subframe attribute of a second serving cell; dividing the subframes of the first serving cell into the multiple subframe groups according to signalling; dividing the subframes of the first serving cell into the multiple subframe groups according to subframe types; and dividing the subframes of the first serving cell into the multiple subframe groups according to a predefined subframe set.

19. The device as claimed in claim 18, wherein the device is located at a terminal or a base station.

\* \* \* \* \*